3,503,506
FILTER PRESSURE SIGNAL
Walter J. Kudlaty, Elmhurst, and Peter Heinrich, Jr., Chicago, Ill., assignors to Marvel Engineering Company, Chicago, Ill., a corporation of Delaware
Filed Oct. 1, 1968, Ser. No. 764,104
Int. Cl. B01d 35/14
U.S. Cl. 210—90                6 Claims

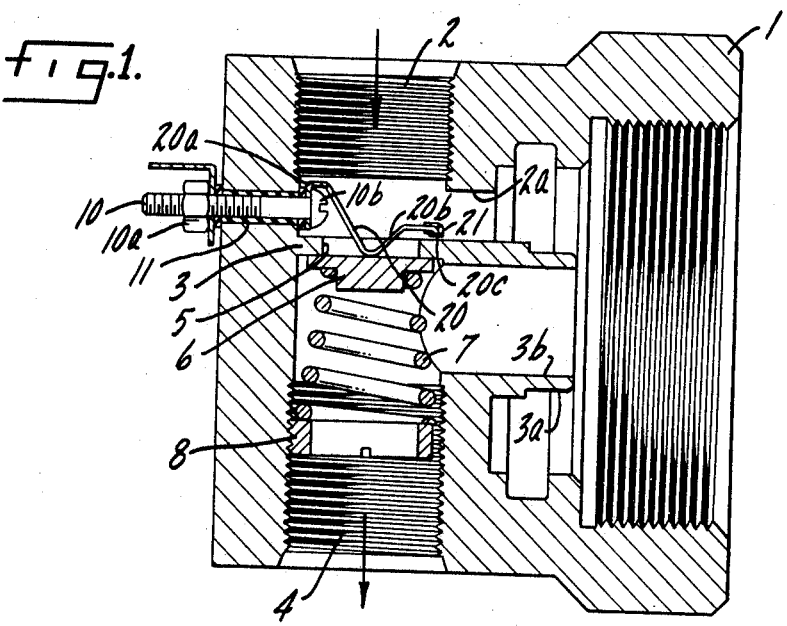

ABSTRACT OF THE DISCLOSURE

A pressure signal for filters in which a wall is moved in response to excess pressure in the filter housing and an electricity-transmitting member is yieldingly urged against the wall for movement therewith to make or break a signal circuit. In one form the wall is a bypass valve. In another form the wall is a piston interchangeable with the bypass valve and electricity-transmitting member.

SUMMARY OF THE INVENTION

An electrical signal terminal extends into a filter housing. A leafspring-like signal-transmitting member is secured to the terminal and extends into the housing inlet for yielding pressure contact with a movable wall which is in turn exposed to pressure to make or break an electrical circuit, through the transmitting member and wall or housing, to activate a signal connected to the terminal. The wall may be a bypass valve or a piston interchangeable therewith.

This invention relates to filters and particularly to signal assemblies effective to signal the presence in the filter housing of excessive pressure normally produced by clogging or contamination of the filter element in the housing.

One purpose of the invention is to provide a filter pressure signal assembly of maximum simplicity and economy in manufacture and use.

Another purpose is to provide a filter signal assembly of maximum reliability and effectiveness.

Another purpose is to provide a filter signal which may be easily modified to either make or break a filter signaling circuit.

Another purpose is to provide a filter housing and signal assembly usable interchangeably with and without means for bypassing fluid when the filter element is clogged.

Another purpose is to provide pistons and bypass valves usable interchangeably with a filter signal assembly.

Other purposes will appear from time to time during the course of the specification and claims.

BRIEF DESCRIPTION OF THE DRAWINGS

The invention is illustrated diagrammatically in the following drawings wherein:

FIGURE 1 is a cross-sectional view;

FIGURE 2 is a cross-sectional detail view of a variant form; and

FIGURE 3 is a cross-sectional detail view of a further variant.

Like parts are indicated by like numerals throughout the specification and drawings.

DESCRIPTION OF THE PREFERRED EMBODIMENT

Referring now to the drawings, the numeral 1 generally indicates a filter housing. In most cases the part 1 will constitute the "head" or "cap" portion of the housing. It will be understood, however, that the head and additional housing portions constitute a container. At 2 is indicated an inlet passage which branches, as at 2a, to deliver fluid into the main housing portion (not shown).

The housing 1 has an axial portion 3, defining a filter element-receiving sleeve 3a and an axial passage 3b communicating the area within such a filter element with a radially-directed outlet passage 4. While, for clarity, a filter element is not shown, those skilled in the art are well aware of the placement of suitable filter media between passages 2a and 3a to screen fluid flowing from inlet 2 to outlet 4.

The wall of portion 3 is apertured as at 5 to communicate inlet 2 directly with outlet 4. A movable wall 6 is yieldingly urged, as by spring 7, against the downstream or outlet side of aperture 5 to close the same against such communication. Spring 7 seats upon a threaded abutment 8 in outlet passage 4.

An electrical terminal 10 extends through the wall of housing 1, the insulating sleeve 11 being provided for this purpose. The terminal 10 has the external signal-supporting portion 10a and the internal portion 10b.

Secured to terminal 10, as at 20a, is a signal or electrical energy-transmitting member 20. The member 20 is bent, intermediate its ends, to provide a movable wall-contacting finger segment 20b. An insulating piece 21 is carried by end segment 20c of member 20 and the intermediate segment 20b is in direct, metal-to-metal, electrical energy-transmitting contact with wall 6. It will be understood that the configuration of member 20, being substantially V-shaped in side elevation in its central portion and having bent opposite end portions for the purposes described, produces a type of leafspring effect wherein member 20 presses against wall 6 and is in turn normally held out of the normal position sought by member 20 by the superior power of spring 7.

In the form of FIGURE 2, the distal end 20c of member 20 overlies in the housing portion 3 at a point adjacent aperture 5. It will be observed that intermediate finger segment 20b extends through aperture 5 to contact wall 6 and end 20c is only slightly spaced from portion 3. Carried by segment 20b, for insulation between it and wall 6, is an insulating piece 31. In all other respects, the structure of FIGURE 2 preferably corresponds to that of FIGURE 1.

Referring now to FIGURE 3, the movable wall 6 has been replaced by a piston member 36. It will be noted that piston 36, while similar to wall 6, carries a central, axial extension 36a in close, sliding engagement with the internal wall of aperture 5. The circumferential surface of piston extension 36a is of sufficient axial length to insure the presence of extension 36a in aperture 5 at all positions of member 36. The end face of extension 36 is recessed or removed to form a V-shaped groove 37 dimensioned to receive the intermediate segment 20b of member 20 and to insure essentially the same relationship between amounts of movement of member 20 whether used in the form of the invention of FIGURE 1 or of FIGURE 3. For example, the base 37a of groove 37 is at the level of the end face of wall member 6 when both are considered as seated against the wall of housing portion 3.

In the form of FIGURE 3 the insulating sleeve 31 is shown, though it will be understood that the form of FIGURE 1, with its piece 21, may equally well be employed in the form of FIGURE 3.

The embodiments of the invention in which an exclusive property or privilege is claimed are defined as follows:

1. A filter assembly including a housing having an inlet and an outlet, an aperture between said inlet and outlet, a movable wall, a spring engaging the outlet side of said wall and urging said wall toward a position closing said aperture against communication therethrough between said inlet and outlet, a signal terminal, an electrical energy-transmitting member having one of its ends secured to said terminal, and an intermediate portion yieldingly engaging the inlet side of said wall, said member having a lesser pressure force against said wall than that of said spring and being separable from said wall when said wall has been moved a predetermined distance against the action of said spring in response to a predetermined excess of pressure in said inlet over the pressure in said outlet.

2. The structure of claim 1 characterized by and including an insulating piece carried between said member and wall and an overlying end portion carried by said member for electrical energy-transmitting contact with said housing adjacent said aperture when said wall has moved said peredtermined distance.

3. The structure of claim 1 wherein said movable wall comprises a bypass valve, said wall being movable said predetermined distance to open said aperture for direct communication between said inlet and outlet.

4. The structure of claim 1 wherein said wall includes a piston extension slidable in said aperture and closing the same against communication of said inlet with said outlet through said aperture at all positions of said wall.

5. The structure of claim 1 wherein said member includes an end portion overlying said housing adjacent said aperture and contacting said housing to limit the movement of said member when said wall has moved said predetermined distance.

6. The structure of claim 5 characterized by and including an insulating piece carried by said member end portion for contact with said housing when said wall has moved said predetermined distance.

References Cited

UNITED STATES PATENTS

| | | | |
|---|---|---|---|
| 2,879,892 | 3/1959 | Frakes | 210—90 |
| 3,442,382 | 5/1969 | Rosaen | 210—130 X |

REUBEN FRIEDMAN, Primary Examiner

FRANK A. SPEAR, Jr., Assistant Examiner

U.S. Cl. X.R.

210—133